United States Patent
Cuthbert et al.

(10) Patent No.: US 10,140,293 B2
(45) Date of Patent: Nov. 27, 2018

(54) COORDINATED USER WORD SELECTION FOR TRANSLATION AND OBTAINING OF CONTEXTUAL INFORMATION FOR THE SELECTED WORD

(71) Applicant: Google LLC, Mountain View, CA (US)

(72) Inventors: Alexander Jay Cuthbert, Oakland, CA (US); Julie Cattiau, San Francisco, CA (US)

(73) Assignee: Google LLC, Mountain View, CA (US)

( * ) Notice: Subject to any disclaimer, the term of this patent is extended or adjusted under 35 U.S.C. 154(b) by 43 days.

(21) Appl. No.: 14/714,419

(22) Filed: May 18, 2015

(65) Prior Publication Data
US 2016/0342585 A1    Nov. 24, 2016

(51) Int. Cl.
G06F 17/21    (2006.01)
G06F 17/28    (2006.01)
G06F 17/27    (2006.01)
G10L 19/008   (2013.01)

(52) U.S. Cl.
CPC ............ *G06F 17/289* (2013.01); *G06F 17/21* (2013.01); *G06F 17/27* (2013.01); *G06F 17/28* (2013.01); *G10L 19/008* (2013.01)

(58) Field of Classification Search
None
See application file for complete search history.

(56) References Cited

U.S. PATENT DOCUMENTS

| | | | |
|---|---|---|---|
| 4,393,460 A | 7/1983 | Masuzawa et al. | |
| 6,151,570 A * | 11/2000 | Fuji | G06F 17/2735 704/3 |
| 7,668,718 B2 | 2/2010 | Kahn et al. | |
| 2003/0204573 A1 * | 10/2003 | Beck | G06F 17/30867 709/218 |
| 2003/0208352 A1 * | 11/2003 | Lee | G06F 17/2872 704/2 |
| 2003/0229622 A1 | 12/2003 | Middelfart | |
| 2005/0267734 A1 | 12/2005 | Masuyama | |

(Continued)

FOREIGN PATENT DOCUMENTS

WO    2014168626 A1    10/2014

OTHER PUBLICATIONS

Wikipedia "Web widget" archive Feb. 4, 2010.*

(Continued)

*Primary Examiner* — Pierre-Louis Desir
*Assistant Examiner* — Yi-Sheng Wang
(74) *Attorney, Agent, or Firm* — Fish & Richardson P.C.

(57) ABSTRACT

A computer-implemented technique can include receiving a selection by a user of a single word in a document in a source language, the document being displayed in a viewing application executing at the computing device, obtaining contextual information from the document that is indicative of a context of the selected word, providing the selected word and its contextual information from the viewing application to a different translation application, obtaining potential translated words using the translation application, the selected word, and its contextual information, each potential translated word being a potential translation of the selected word to a different target language that is preferred by the user, and displaying the potential translated words.

20 Claims, 4 Drawing Sheets

(56) References Cited

U.S. PATENT DOCUMENTS

| | | | | |
|---|---|---|---|---|
| 2008/0184128 A1* | 7/2008 | Swenson | ............... | G09G 5/14 |
| | | | | 715/738 |
| 2009/0182548 A1* | 7/2009 | Zwolinski | ........... | G06F 17/2735 |
| | | | | 704/3 |
| 2009/0251420 A1* | 10/2009 | Do | .................. | G06F 3/04883 |
| | | | | 345/173 |
| 2009/0299732 A1* | 12/2009 | Hao | ................ | G06F 17/2735 |
| | | | | 704/10 |
| 2010/0229112 A1* | 9/2010 | Ergan | ............... | G06F 3/04895 |
| | | | | 715/764 |
| 2010/0286979 A1* | 11/2010 | Zangvil | .............. | G06F 17/273 |
| | | | | 704/9 |
| 2013/0191108 A1* | 7/2013 | Anisimovich | ........ | G06F 17/289 |
| | | | | 704/4 |
| 2014/0081619 A1* | 3/2014 | Solntseva | ............ | G06F 17/289 |
| | | | | 704/3 |
| 2014/0188456 A1* | 7/2014 | Rylov | ............... | G06F 17/2735 |
| | | | | 704/9 |
| 2015/0160856 A1* | 6/2015 | Jang | ................ | G06F 3/04886 |
| | | | | 715/773 |
| 2015/0370785 A1* | 12/2015 | Mauser | .............. | G06F 17/289 |
| | | | | 704/7 |

OTHER PUBLICATIONS

Wikipedia "E-reader", archive Aug. 10, 2014.*
Wikipedia on E-reader ("E-reader", Wikipedia archive Aug. 10, 2014).*
PCT International Search Report and Written Opinion dated Aug. 2, 2016 for International Application No. PCT/US2016/032146, 10 pages.

* cited by examiner

COORDINATED USER WORD SELECTION FOR TRANSLATION AND OBTAINING OF CONTEXTUAL INFORMATION FOR THE SELECTED WORD

FIELD

The present disclosure generally relates to language translation and, more particularly, to techniques for coordinated user word selection for translation and obtaining of contextual information for the selected word.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When reading a document in a non-preferred language in a viewing application (a web browser, an e-reader, etc.), a user may periodically come across individual words that the user does not recognize or understand. In these events, the user may select a word in the document to obtain its translation in one of his/her preferred languages. This typically involves cutting and pasting the selected word from the document into another application, such as a search application or a language translation application. Possible translations of the selected word that are returned to the user by the other application, however, may be inaccurate or otherwise inappropriate due to the lack of any contextual information.

SUMMARY

A computer-implemented technique is presented. The technique can include receiving, at a computing device having one or more processors, a selection by a user of a single word in a document in a source language, the document being displayed in a viewing application executing at the computing device; obtaining, by the computing device, contextual information from the document that is indicative of a context of the selected word; providing, by the computing device, the selected word and its contextual information from the viewing application to a different translation application; obtaining, by the computing device, potential translated words using the translation application, the selected word, and its contextual information, each potential translated word being a potential translation of the selected word to a different target language that is preferred by the user; and displaying, by the computing device, the potential translated words.

A computing system having one or more processors configured to perform operations is also presented. The operations can include receiving a selection by a user of a single word in a document in a source language, the document being displayed in a viewing application executing at the computing device; obtaining contextual information from the document that is indicative of a context of the selected word; providing the selected word and its contextual information from the viewing application to a different translation application; obtaining potential translated words using the translation application, the selected word, and its contextual information, each potential translated word being a potential translation of the selected word to a different target language that is preferred by the user; and displaying the potential translated words.

In some implementations, the translation application is executing at the computing device. In some implementations, an operating system of the computing device is configured to both (i) obtain the contextual information and (ii) provide the selected word and its contextual information from the viewing application to the translation application. In some implementations, the contextual information is at least a portion of a full screen capture by the computing device. In some implementations, the contextual information is the full screen capture.

In some implementations, the technique or operations further comprise: extracting, by the computing device, contextual features of the selected word using the contextual information, each contextual feature being a machine-learned feature indicative of a use of the selected word; and obtaining, by the computing device, the potential translated words using the translation application, the selected word, and its extracted contextual features. In some implementations, the contextual features include at least one of (i) one or more words from at least the portion of the full screen capture and (ii) an image from at least the portion of the full screen capture.

In some implementations, the contextual information is obtained in response to the selection of the selected word by the user. In some implementations, the contextual information is obtained (i) after the selection of the selected word by the user and (ii) in response to a selection, by the user, of a translation command from a menu displayed by the computing device. In some implementations, the contextual information is obtained (i) after the selection of the selected word by the user and (ii) in response to a slide input, by the user, to the computing device.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
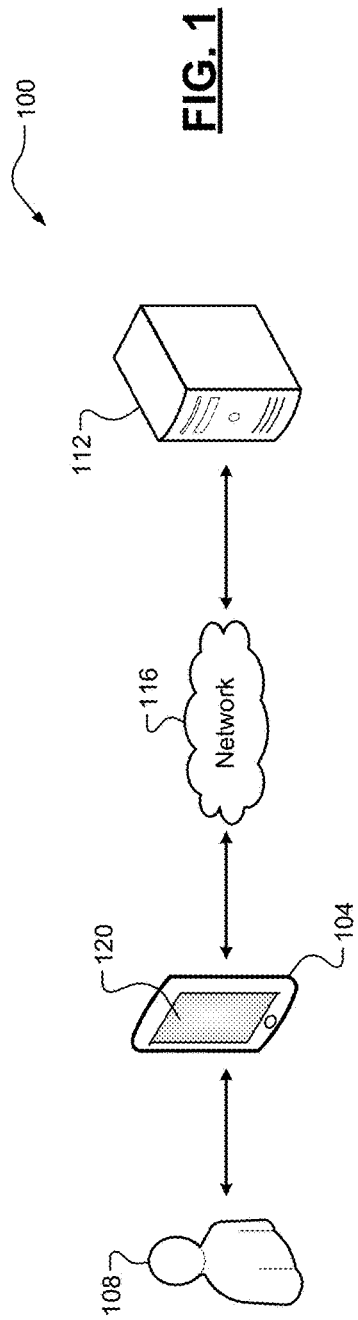
FIG. 1 is a diagram of a computing system including an example computing device according to some implementations of the present disclosure.

As previously mentioned, conventional language translation techniques involve a user cutting and pasting a selected single word from a viewing application (a web browser, an e-reader, etc.) into a search or translation application. The search or translation application, however, lacks any contextual information for the selected word, and thus potential translations of the selected word may be inaccurate or otherwise inappropriate. For example, words such as "bear" and "slip" each have a plurality of meanings in the English language. By providing the word "bear" without any contextual information, a most-likely translated word may be a translated word corresponding to the animal, even though the context was to "bear left" or "bear right" in the navigational context. Similarly, by providing the word "slip" without any contextual information, a most-likely translated word may be a translated word corresponding to the act of losing one's balance, even though the context was a misspeaking ("a slip of the tongue").

Accordingly, techniques are presented for coordinated user selection of a word for translation and obtaining of contextual information for the selected word. The techniques improve a user's reading experience by providing for seamless and accurate translation of individual words by limiting lengthy interruptions and increasing translation accuracy. The techniques involve obtaining and utilizing at least a portion of a full screen capture in obtaining potential translations of a selected word from a translation application that differs from a current viewing application. For example, the translation process may be initiated in response to the word selection, or after the word selection and in response to (i) a menu selection or (ii) a slide input. The selected word and the contextual information (e.g., contextual features) are utilized by a different translation application to obtain potential translated words for display to the user. The passing of information between the viewing and translation applications can occur at an operating system level, thereby providing for a seamless experience for the user.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Referring now to FIG. 1, a computing system 100 including an example computing device 104 is illustrated. Examples of the computing device 104 include, but are not limited to, a desktop computer, a laptop computer, a tablet computer, and a mobile phone. A user 108 can interact with the computing device 104, and the computing device 104 can communicate with a remote server 112 via a network 116. In some implementations, the server 112 can be configured to perform at least a portion of the language translation discussed herein. The network 116 can include a local area network (LAN), a wide area network (WAN), e.g., the Internet, or a combination thereof. The computing device 104 can include a display 120 configured to display a document and potential word translations to the user 108. In some implementations, the display 120 is a touch display.

Figure 2:
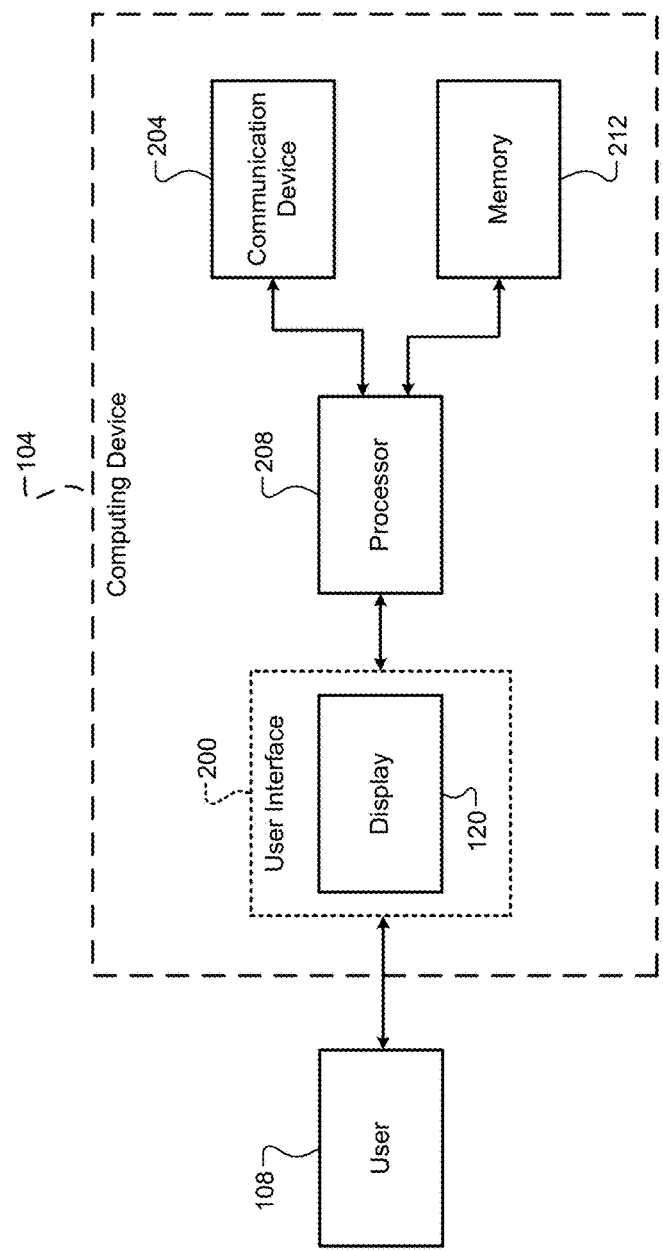
FIG. 2 is a functional block diagram of the example computing device of FIG. 1.

Referring now to FIG. 2, the example computing device 104 is illustrated. The computing device 104 can include a user interface 200, a communication device 204, a processor 208, and a memory 212. The user interface 200 can include any suitable components for receiving input from and outputting information to the user 108. Example components of the user interface 200 include, but are not limited to, the display 120, a physical keyboard, a mouse, and other physical buttons. The communication device 204 can include any suitable components (e.g., a transceiver) configured for communication with the server 112. The memory 212 can be any suitable storage medium (flash, hard disk, etc.) configured to store information at the computing device 104. For example, a set of preferred languages for the user 108 may be stored locally at the memory 212, remotely at the server 112, or a combination thereof.

The processor 208 can control operation of the computing device 104. Example functions performed by the processor 208 include, but are not limited to, loading/executing an operating system of the computing device 104, loading/executing applications at the computing device 104, interpreting input via and controlling information displayed by the user interface 200, controlling communication with other components on the network 116 (e.g., the server 112) via the communication device 204, and controlling read/write operations at the memory 212. The term "processor" as used herein can refer to both a single processor and a plurality of processors operating in a parallel or distributed architecture. The processor 208 can also be configured to perform at least a portion of the techniques of the present disclosure, which are now discussed in greater detail below.

Figures 3A, 3B:
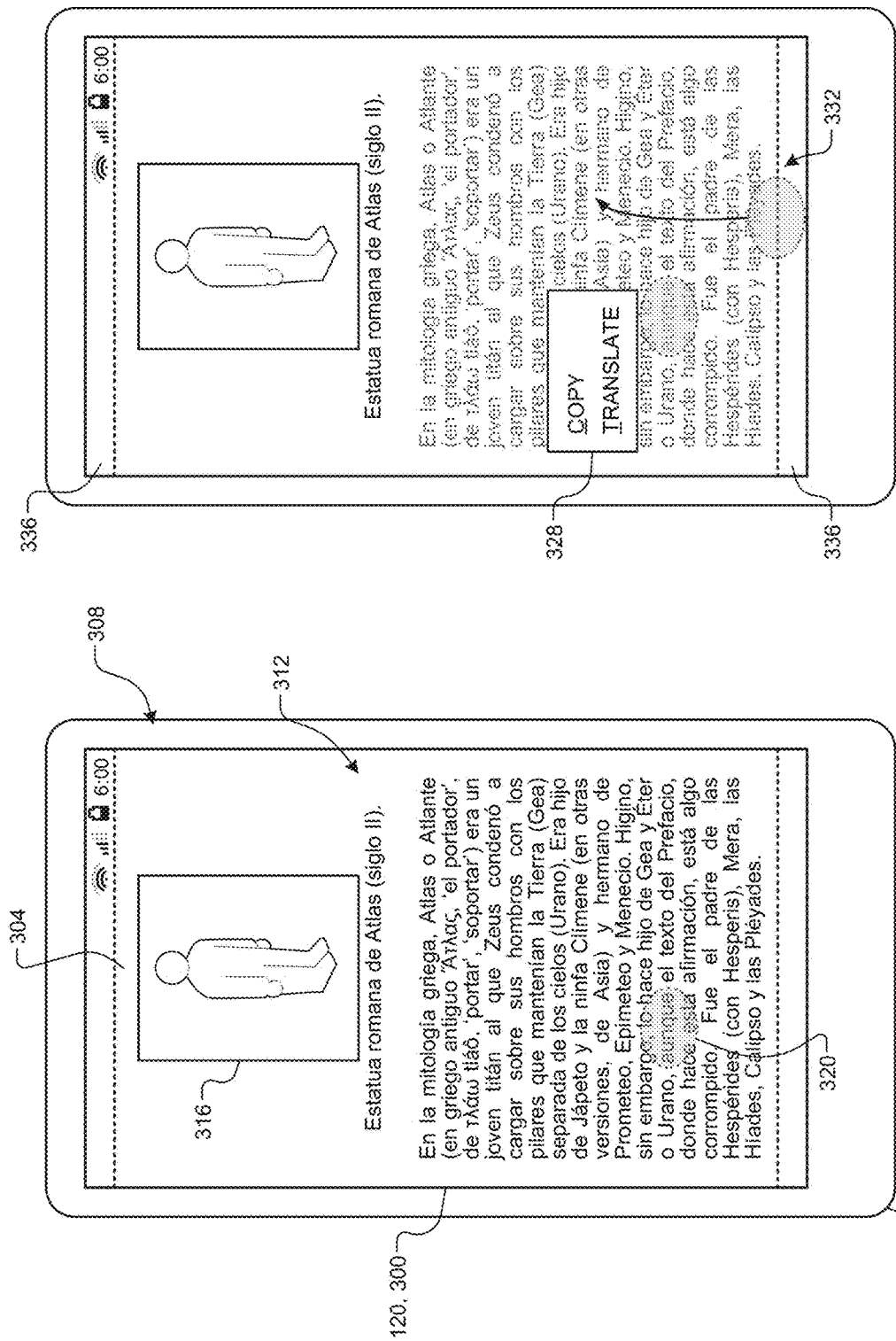
FIGS. 3A-3B illustrate example user selections of a word for translation according to some implementations of the present disclosure.

Referring now to FIGS. 3A-3B, example user selections of a word for translation are illustrated. The display 120 of the computing device 104 defines a viewable area 300. This viewable area 300 represents an entire viewable area of the display 120. A viewing application 304 is executing at the computing device 104 and is displayed in at least a portion of the viewable area 300. The viewing application 304 is displaying a document 308 for the user 108 to read. Examples of the document 308 include, but are not limited to, an e-book, an e-magazine, an e-newspaper, an online blog, and any suitable web page. The document 308 includes a text 312 and, in some cases, an image 316. The document 308 can be in a source language that is different than preferred language(s) of the user 108. For example only, the document 308 may be in Spanish, but the preferred language of the user 108 may be English.

When the user 108 comes across a single word that she/he does not understand, she/he can select a word 320 for translation. Example techniques for selecting the word 320 include, but are not limited to, highlighting the word 320, such as using endpoint markers, or directly selecting the word 320, such as using a touch input 324 over the word 320 or using a single mouse click over the word 320. For example, the user 108 may select the word 320 using a short press. In some implementations, a sentence or block of the text 312 could be selected by the user 108 positioning two or more of her/his fingers to create a boundary encompassing a portion of the text 312. As shown, the selected word 320 is the Spanish word "aunque." The selection of the word 320 by the user 108 can be part of a translation trigger condition. The translation trigger condition represents a set of received inputs that cause the computing device 104 to perform the translation techniques of the present disclosure. In some implementations, the translation trigger condition can include additional inputs, such as (i) a user selection of a menu command and (ii) a slide input.

That is, in response to the word selection, the computing device 104 may present the user 108 with a menu 328 of commands ("Copy" or "Translate"). For example, this menu 328 could be a pop-up menu overlaying the text 312 as shown. In some implementations, the user 108 can select the word 320 using a long press, which then brings up the menu 328. When the user 108 selects the translate command from the menu 328, the translation trigger condition can be detected. Alternatively, after the word selection, the user 108 can provide a slide input 332, which can cause the translation trigger condition to be detected. For example, the slide input 332 can be a specific slide input, such as a slide input from a bottom of the display 120 in an upward direction as shown. In some implementations, the specific direction and/or specific length of the slide input 332 for the translation trigger condition can be defined by the user 108. By requiring additional user input in addition to the word selection, user privacy can be controlled by not automatically obtaining at least the portion of the full screen capture (e.g., in response to an accidental word selection by the user 108).

In response to detecting the translation trigger condition, the computing device 104 can obtain contextual information for the selected word 320. The contextual information can be indicative of a context of the selected word 320. In one implementation, the computing device 104 can obtain a full screen capture or screenshot of the display 120. The full screen capture can represent the entire viewable area 300 of the display 300. Thus, the full screen capture may include portions of the viewable area 300 (e.g., a system tray 336) that are distinct from the viewing application 304. The entire viewable area 300 of the display 120 may also be referred to as the entire viewport of the computing device 104. In some implementations, the computing device 104 may obtain a quadrant (i.e., a quarter) or another sub-portion of the full screen capture that includes the selected word 320. In other implementations, the computing device 104 may obtain a portion of the full screen capture having a specific number of words (phrase, sentence, paragraph, etc.) and/or images surrounding the selected word 320.

The computing device 104 can provide the selected word 320 and its contextual information (e.g., the full screen capture) to a different search or translation application (hereinafter "translation application"), which may be executing at the computing device 104. In some implementations, this passing of information is seamlessly performed by the operating system of the computing device 104. That is, the operating system can pass the selected word and its contextual information to the translation application without the user 108 knowing or otherwise seeing what is occurring. This may also include the seamless passing of potential translated words by the operating system from the translation application back to the viewing application. In other implementations, the viewing application and the translation communication can directly communicate with each other. In some implementations, the translation application is a widget or other type of application that is executable within the viewing application (e.g., a web-based widget executable within a viewing web browser). In some implementations, the translation application is configured to communicate with a remote server (e.g., server 112) to obtain translations.

In some implementations, the contextual information (e.g., the full screen capture) is analyzed and contextual features for the selected word 320 are extracted. These contextual features can include further information based on the words/images surrounding the selected word 320. In some implementations, each contextual feature is a machine-learned feature indicative of a use of the selected word. The analysis may include utilizing optical character recognition (OCR) and/or image detection/recognition techniques. Examples of contextual features can include, but are not limited to, a topic of the document 308, parts-of-speech for the selected word 320 and its surrounding words, and other metadata associated with the document 308. For example, an extracted feature may be a word or description associated with an image near the selected word 320. In the image 332 depicted in FIGS. 3A-3B, the image is associated with the phrase "Roman statue of Atlas." Similarly, in the text 328 depicted in FIGS. 3A-3B, the phrase "sin embargo" ("however" in English) is a contextual feature for the selected word 320.

Figure 4B:
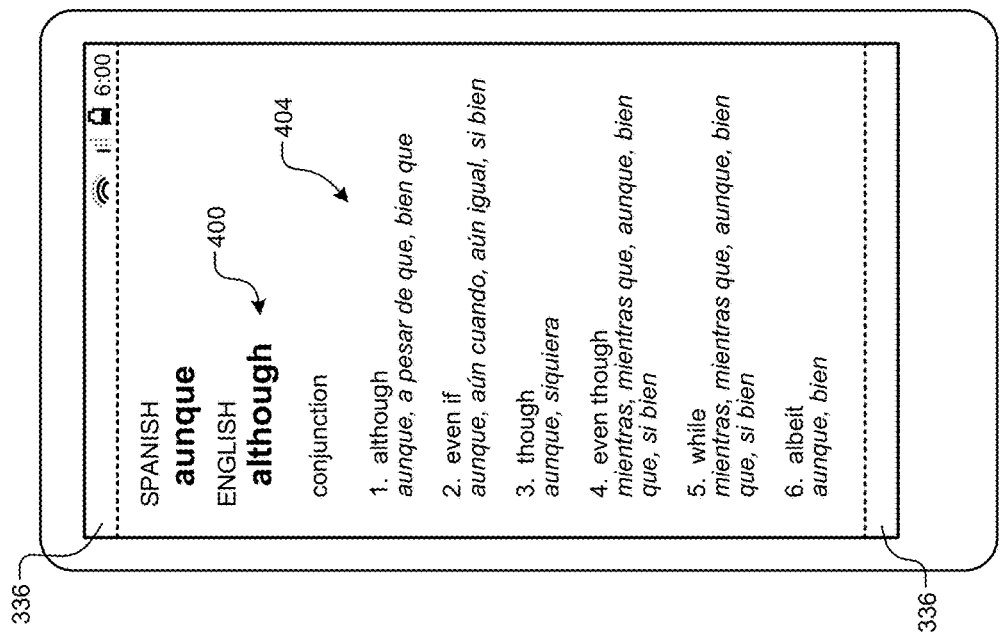
FIGS. 4A-4B illustrate example possible translations of the selected word for presentation to the user according to some implementations of the present disclosure.
Figure 4A:
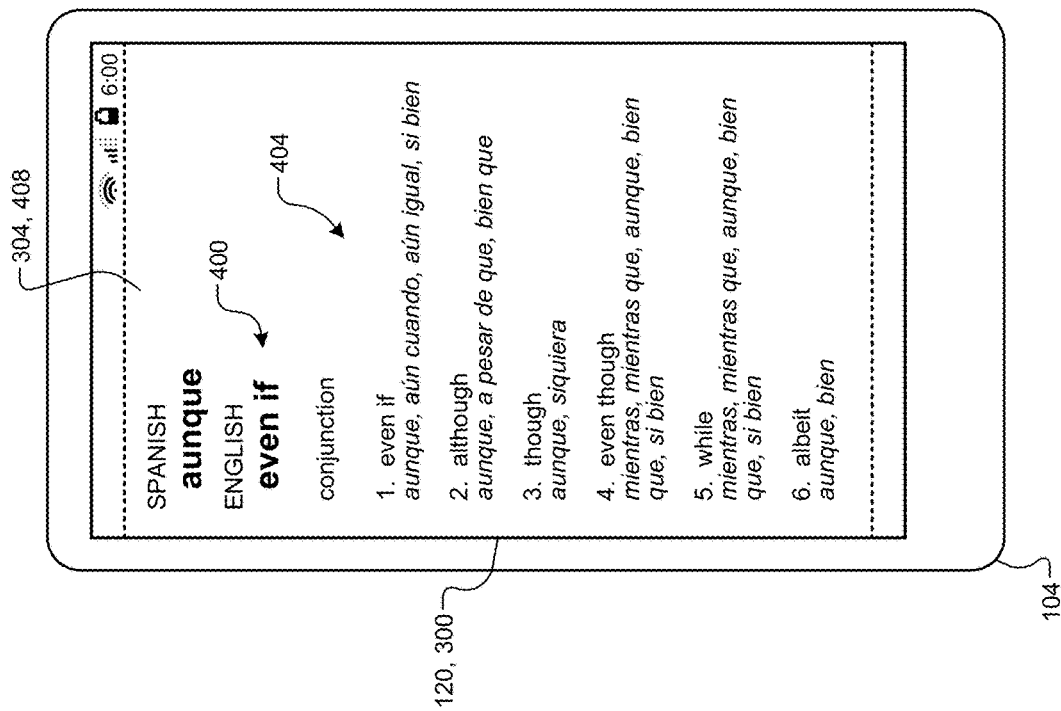

Referring now to FIGS. 4A-4B, example potential translations of the selected word for presentation to the user 108 are illustrated. Without any contextual information, the potential translated words can be based on word frequency. As shown in FIG. 4A, a most-likely potential translation for the selected word 320 from Spanish to English is the phrase "even if." The sentence containing the selected word 320, however, recites "Higino, sin embargo, lo hace hijo de Gea y Éter o Urano, aunque el texto del Prefacio, donde hace esta afirmación, está algo corrompido." (emphases added). An accurate translation of this sentence in English is "Hygnio, however, makes him the son of Gaia and Aether, although the text of the Prefacio, where this statement is from, is somewhat corrupt." Thus, without the contextual information, the phrase "even if" would be provided to the user 108 as a most-likely potential translated word 400, which does not make sense in this context. But, in view of the phase "sin embargo" ("however"), the most-likely potential translated word 400 becomes "although" as shown in FIG. 4B.

After obtaining the potential translated words 404, the potential translated words 408 can be presented to the user 108. As previously discussed, at least a portion of the translation activities may be performed by the server 112. In some implementations, the potential translated words 404 are ranked according to their relative likelihoods that they are an appropriate translation of the selected word 320. For example, the potential translated words 404 may be displayed in a ranked list from most-likely to least-likely. The potential translated words 404 can be displayed to the user 108 via the translation application 408 or via the viewing application 304. Rather, the potential translated words may be provided back to the viewing application 304 from the translation application 408 (e.g., via the operating system of the computing device 104). For example, the potential translated words 404 could be presented to the user 108 in a pop-up window, such as a full screen pop-up window, in the viewing application 304. The user 108 can then view these potential translated words to better ascertain the meaning of the document 308.

Figure 5:
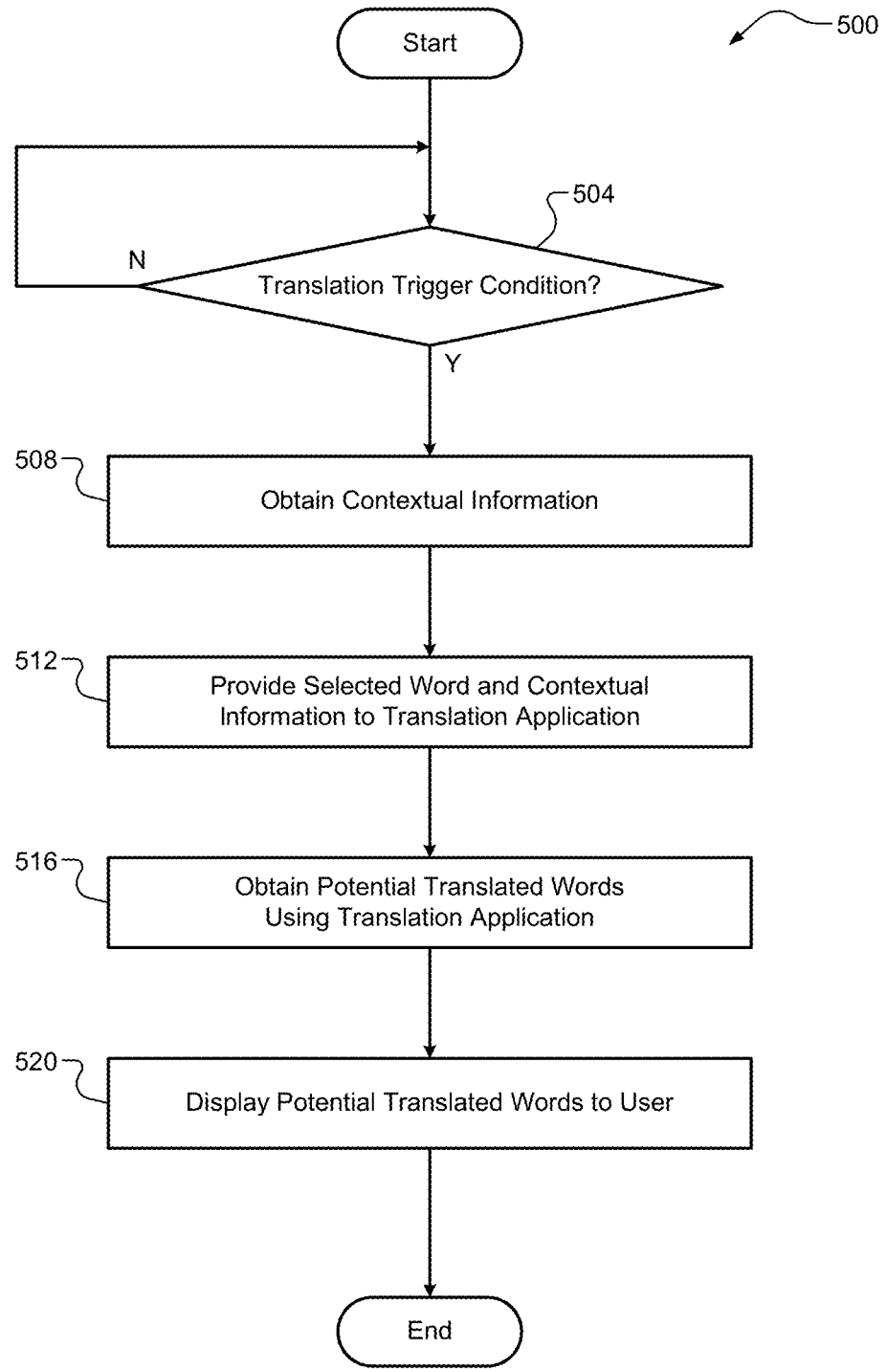
FIG. 5 is a flow diagram of an example technique for coordinated user selection of a word for translation and obtaining of contextual information for the selected word according to some implementations of the present disclosure.

Referring now to FIG. 5, a flow diagram of an example technique 500 for coordinated user selection of a word for translation and obtaining of contextual information for the selected word is illustrated. At 504, the computing device 104 can detect a translation trigger condition. In one implementation, the translation trigger condition includes a user selection of a single word in the document displayed in the viewing application. In some implementations, the translation trigger condition further includes a subsequent (i) user selection of a menu command or (ii) slide input. When the translation trigger condition is detected, the technique 500 can proceed to 508. Otherwise, the technique 500 can return to 504.

At 508, the computing device 104 can obtain contextual information from the document that is indicative of a context of the selected word. In some implementations, this includes obtaining at least a portion of a full screen capture of the display 120. The full screen capture can represent an image of an entire viewable area of the display 120, and thus may include viewable area outside of the viewing application. At 512, the computing device 104 can provide the selected word and its contextual information from the viewing application to a different translation application. In some implementations, the computing device 104 can extract contextual features for the selected word from at least the portion of the full screen capture and provide the extracted contextual features to the translation application.

At 516, the computing device 104 can obtain potential translated words using the translation application, the selected word, and its contextual information, each potential translated word being a potential translation of the selected word to a different target language that is preferred by the user 108. In some implementations, at least a portion of this translation activity is performed by the server 112. For example, the computing device 104 may send the selected word and its contextual information or its extracted contextual features to the server 112 and, in return, may receive at least some of the potential translated words. At 520, the computing device 104 can display the potential translated words. In some implementations, the potential translated words can be displayed in the viewing application. The technique 500 can then end or return to 504.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
receiving, at a viewing application executing in a foreground at a computing device, a touch input from a user, the touch input comprising:
  (i) a first portion indicating a selection of a single selected word in a document in a source language, the document being displayed in the viewing application, wherein the viewing application is not configured to perform language translation; and
  (ii) a second portion following the first portion and indicating a trigger command for obtaining a translation of the selected word from the source language to the target language; and
in response to receiving the touch input:
  obtaining, by an operating system executing at the computing device, contextual information from at least a portion of a full screen capture of the document, wherein the full screen capture includes an entire viewable area of the computing device, wherein the portion of the full screen capture is associated with the selected word, and wherein the contextual information is indicative of a context of the selected word as it is used in the document;
  extracting, by the computing device, contextual features of the selected word using the contextual information, each contextual feature being a machine-learned feature indicative of a use of the selected word, wherein the contextual features include both (i) one or more first words from at least the portion of the full screen capture and (ii) an image from at least the portion of the full screen capture, wherein the image does not include the one or more first words and the selected word;
  providing, from the operating system and to a different translation application, the selected word and its contextual information, wherein receipt of the selected word and its contextual information causes the translation application to obtain and output potential translated words to the operating system, wherein the translation application (i) is distinct from the viewing application, (ii) is launched by the operating system in a background at the computing device or is already executing in the background at the computing device, and (iii) is configured to obtain the potential translated words using the selected word and its extracted contextual features;
  providing, from the operating system to the viewing application, the potential translated words, each potential translated word being a potential translation of the selected word to a different target language that is preferred by the user; and
  displaying, by the viewing application, the potential translated words.

2. The computer-implemented method of claim 1, wherein the contextual information is the entire full screen capture.

3. The computer-implemented method of claim 1, wherein the second portion of the touch input is a selection of the trigger command from a menu displayed by the computing device.

4. The computer-implemented method of claim 3, further comprising displaying, at the computing device, the menu in response to receiving the first portion of the touch input.

5. The computer-implemented method of claim 1, wherein the second portion of the touch input is a slide input in a specific direction.

6. The computer-implemented method of claim 5, wherein the specific direction is a predefined setting.

7. The computer-implemented method of claim 5, wherein the specific direction is a user-specified setting.

8. The computer-implemented method of claim 1, wherein:
the selected word is proximate to the image;
extracting the contextual features further includes performing image detection or image recognition on the image to obtain one or more second words associated with the image; and
obtaining the potential translated words is based on the one or more second words.

9. The computer-implemented method of claim 1, further comprising:

transmitting, from the computing device and to a remote server, the selected word and its extracted contextual features; and receiving, by the computing device and from the remote server via the network, the potential translated words.

10. The computer-implemented method of claim 1, further comprising filtering, at the computing device, the full screen capture to obtain the portion of the full screen capture by removing portions of the full screen capture that are distinct from the viewing application.

11. A computing system comprising one or more processors and a non-transitory memory having a set of instructions stored thereon that, when executed by the one or more processors, causes the computing system to perform operations comprising:

receiving, at a viewing application executing in a foreground at the computing device, a touch input from a user, the touch input comprising:
  (i) a first portion indicating a selection of a single selected word in a document in a source language, the document being displayed in the viewing application, wherein the viewing application is not configured for language translation; and
  (ii) a second portion following the first portion indicating a trigger command for obtaining a translation of the selected word from the source language to the target language; and in response to receiving the touch input:
  obtaining, by an operating system executing at the computing device, contextual information from at least a portion of a full screen capture of the document, wherein the full screen capture includes an entire viewable area of the computing device, wherein the portion of the full screen capture is associated with the selected word, and wherein the contextual information is indicative of a context of the selected word as it is used in the document;
  extracting contextual features of the selected word using the contextual information, each contextual feature being a machine-learned feature indicative of a use of the selected word, wherein the contextual features include both (i) one or more first words from at least the portion of the full screen capture and (ii) an image from at least the portion of the full screen capture, wherein the image does not include the one or more first words and the selected word;
  providing, from the operating system and to a different translation application, the selected word and its contextual information, wherein receipt of the selected word and its contextual information causes the translation application to obtain and output potential translated words to the operating system, wherein the translation application (i) is distinct from the viewing application, (ii) is launched by the operating system in a background at the computing device or is already executing in the background at the computing device, and (iii) is configured to obtaining the potential translated words using the selected word and its extracted contextual features;
  providing, from the operating system and to the viewing application, the potential translated words, each potential translated word being a potential translation of the selected word to a different target language that is preferred by the user; and
  displaying, by the viewing application, the potential translated words.

12. The computing system of claim 11, wherein the contextual information is the entire full screen capture.

13. The computing system of claim 11, wherein the second portion of the touch input is a selection of the trigger command from a menu displayed by the computing device.

14. The computing system of claim 13, wherein the operations further comprise displaying the menu in response to receiving the first portion of the touch input.

15. The computing system of claim 11, wherein the second portion of the touch input is a slide input in a specific direction.

16. The computing system of claim 15, wherein the specific direction is a predefined setting.

17. The computing system of claim 15, wherein the specific direction is a user-specified setting.

18. The computing system of claim 11, wherein:
the selected word is proximate to the image;
extracting the contextual features further includes performing image detection or image recognition on the image to obtain one or more second words associated with the image; and
obtaining the potential translated words is based on the one or more second words.

19. The computing system of claim 11, wherein the operations further comprise:
transmitting, to a remote server via a network, the selected word and its extracted contextual features; and
receiving, from the remote server via the network, the potential translated words.

20. The computing system of claim 11, wherein the operations further comprise filtering the full screen capture to obtain the portion of the full screen capture by removing portions of the full screen capture that are distinct from the viewing application.

* * * * *